United States Patent
Carreira et al.

(10) Patent No.: US 11,361,546 B2
(45) Date of Patent: *Jun. 14, 2022

(54) ACTION RECOGNITION IN VIDEOS USING 3D SPATIO-TEMPORAL CONVOLUTIONAL NEURAL NETWORKS

(71) Applicant: DeepMind Technologies Limited, London (GB)

(72) Inventors: Joao Carreira, St Albans (GB); Andrew Zisserman, London (GB)

(73) Assignee: DeepMind Technologies Limited, London (GB)

( * ) Notice: Subject to any disclaimer, the term of this patent is extended or adjusted under 35 U.S.C. 154(b) by 77 days.

This patent is subject to a terminal disclaimer.

(21) Appl. No.: 17/004,814

(22) Filed: Aug. 27, 2020

(65) Prior Publication Data

US 2020/0394412 A1 Dec. 17, 2020

Related U.S. Application Data

(63) Continuation of application No. 16/681,671, filed on Nov. 12, 2019, now Pat. No. 10,789,479, which is a
(Continued)

(51) Int. Cl.
*G06K 9/62* (2022.01)
*G06N 3/04* (2006.01)
(Continued)

(52) U.S. Cl.
CPC .......... *G06V 20/41* (2022.01); *G06K 9/6256* (2013.01); *G06N 3/049* (2013.01); *G06N 3/0454* (2013.01);
(Continued)

(58) Field of Classification Search
None
See application file for complete search history.

(56) References Cited

U.S. PATENT DOCUMENTS

2017/0206405 A1* 7/2017 Molchanov ........ G06K 9/00355
2018/0032846 A1* 2/2018 Yang .................... G06K 9/4604
(Continued)

FOREIGN PATENT DOCUMENTS

JP 2018055287 4/2018

OTHER PUBLICATIONS

Tran et al., "Learning Spatiotemporal Features with 3D Convolutional Networks," 2015 IEEE International Conference on Computer Vision, Dec. 7-13, 2015 (Year: 2015).*
(Continued)

*Primary Examiner* — Soo Shin
(74) *Attorney, Agent, or Firm* — Fish & Richardson P.C.

(57) ABSTRACT

Methods, systems, and apparatus, including computer programs encoded on computer storage media, for processing video data. An example system receives video data and generates optical flow data. An image sequence from the video data is provided to a first 3D spatio-temporal convolutional neural network to process the image data in at least three space-time dimensions and to provide a first convolutional neural network output. A corresponding sequence of optical flow image frames is provided to a second 3D spatio-temporal convolutional neural network to process the optical flow data in at least three space-time dimensions and to provide a second convolutional neural network output. The first and second convolutional neural network outputs are combined to provide a system output.

20 Claims, 4 Drawing Sheets

Related U.S. Application Data continuation of application No. PCT/EP2018/062486, filed on May 15, 2018.

(60) Provisional application No. 62/506,507, filed on May 15, 2017.

(51) Int. Cl.

| | |
|---|---|
| *G06N 3/08* | (2006.01) |
| *G06T 7/269* | (2017.01) |
| *G06V 10/44* | (2022.01) |
| *G06V 10/82* | (2022.01) |
| *G06V 20/40* | (2022.01) |
| *G06V 40/20* | (2022.01) |

(52) U.S. Cl.
CPC .............. *G06N 3/08* (2013.01); *G06T 7/269* (2017.01); *G06T 2207/10016* (2013.01); *G06T 2207/10024* (2013.01); *G06T 2207/20084* (2013.01)

(56) References Cited

U.S. PATENT DOCUMENTS

| | | | |
|---|---|---|---|
| 2019/0156210 A1* | 5/2019 | He | G06N 3/0481 |
| 2019/0303677 A1* | 10/2019 | Choutas | G06K 9/00718 |
| 2020/0125852 A1 | 4/2020 | Carreira et al. | |

OTHER PUBLICATIONS

Simonyan et al., "Two-Stream Convolutional Networks for Action Recognition in Videos," arXiv:1406.2199, v1 Mon, Jun. 9, 2014, v2 Wed, Nov. 12, 2014 (Year: 2014).*

EP Office Action in European Appln. No. 18732665.7, dated Mar. 26, 2021, 8 pages.

Abadi et al., "TensorFlow: Large-Scale Machine Learning on Heterogeneous Distributed Systems," https://arxiv.org/abs/1603.04467, Mar. 2016, 19 pages.

Bilen et al., "Dynamic Image Networks for Action Recognition," 2016 IEEE Conference on Computer Vision and Pattern Recognition (CVPR), Jun. 2016, 3034-3042.

Bobick et al., "The Recognition of Human Movement Using Temporal Templates," IEEE Transactions on Pattern Analysis and Machine Intelligence, Mar. 2001, 23(3):257-267.

Cooijmans et al., "Recurrent Batch Normalization," https://arxiv.org/abs/1603.09025, last revised Feb. 2017, 13 pages.

Diba et al., "Efficient Two-Stream Motion and Appearance 3D CNNs for Video Classification," https://arxiv.org/abs/1608.08851v2, last revised Sep. 2016, 4 pages.

Donahue et al., "Long-Term Recurrent Convolutional Networks for Visual Recognition and Description," 2015 IEEE Conference on Computer Vision and Pattern Recognition (CVPR), Jun. 2015, 2625-2634.

Fathi et al., "Action Recognition by Learning Mid-level Motion Features," 2008 IEEE Conference on Computer Vision and Pattern Recognition, Jun. 2008, 8 pages.

Feichtenhofer et al., "Convolutional Two-Stream Network Fusion for Video Action Recognition", 2016 IEEE Conference on Computer Vision and Pattern Recognition (CVPR), Jun. 2016, 1933-1941.

Feichtenhofer et al., "Spatiotemporal Residual Networks for Video Action Recognition," https://arxiv.org/abs/1611.02155, Nov. 2016, 9 pages.

Fernando et al., "Modeling Video Evolution for Action Recognition," 2015 IEEE Conference on Computer Vision and Pattern Recognition (CVPR), Jun. 2015, 5378-5387.

Girshick et al., "Rich Feature Hierarchies for Accurate Object Detection and Semantic Segmentation," 2014 IEEE Conference on Computer Vision and Pattern Recognition (CVPR), Jun. 2014, 580-587.

Gkioxari et al., "Finding Action Tubes," 2015 IEEE Conference on Computer Vision and Pattern Recognition (CVPR), Jun. 2015, 759-768.

He et al., "Deep Residual Learning for Image Recognition," 2016 IEEE Conference on Computer Vision and Pattern Recognition (CVPR), Jun. 2016, 770-778.

Ioffe et al., "Batch Normalization: Accelerating Deep Network Training by Reducing Internal Covariate Shift," https://arxiv.org/abs/1502.03167, Mar. 2015, 11 pages.

Ji et al., "3D Convolutional Neural Networks for Human Action Recognition," IEEE Transactions on Pattern Analysis and Machine Intelligence, Jan. 2013, 35(1):221-231.

Karpathy et al., "Large-scale Video Classification with Convolutional Neural Networks," The IEEE Conference on Computer Vision and Pattern Recognition (CVPR), Jun. 2014, 1725-1732.

Kay et al., "The Kinetics Human Action Video Dataset," https://arxiv.org/abs/1705.06950, May 2017, 22 pages.

Klaser et al., "Human Focused Action Localization in Video," European Conference on Computer Vision, Sep. 2010, 219-233.

Kuehne et al., "HMDB: A large video database for human motion recognition," 2011 International Conference on Computer Vision (ICCV), Nov. 2011, 8 pages.

Laptev et al., "Learning realistic human actions from movies," 2008 IEEE Conference on Computer Vision and Pattern Recognition, Jun. 2008, 8 pages.

Li et al., "VideoLSTM Convolves, Attends and Flows for Action Recognition," https://arxiv.org/abs/1607.01794, Jul. 2016, 17 pages.

Mansimov et al., "Initialization Strategies of Spatio-Temporal Convolutional Neural Networks," https://arxiv.org/abs/1503.07274, Mar. 2015, 9 pages.

Niebles et al., "Unsupervised Learning of Human Action Categories Using Spatial-Temporal Words," International Journal of Computer Vision, Mar. 2008, 79(3): 20 pages.

Oquab et al., "Learning and Transferring Mid-Level Image Representations using Convolutional Neural Networks," 2014 IEEE Conference on Computer Vision and Pattern Recognition, Jun. 2014, pp. 1717-1724.

PCT International Search Report and Written Opinion in International Appln. No. PCT/EP2018/062486, dated Oct. 2, 2018, 14 pages.

PCT International Preliminary Report on Patentability in International Appln. No. PCT/EP2018/062486, dated Nov. 28, 2019, 11 pages.

Peng et al., "Multi-region Two-Stream R-CNN for Action Detection," European Conference on Computer Vision, Sep. 2016, 744-759.

Ren et al., "Faster R-CNN: Towards Real-Time Object Detection with Region Proposal Networks," https://arxiv.org/abs/1506.01497v2, Sep. 2015, 10 pages.

Saha et al., "Deep Learning for Detecting Multiple Space-Time Action Tubes in Videos," British Machine Vision Conference (BMVC), Sep. 2016, 13 pages.

Simonyan et al., "Two-Stream Convolutional Networks for Action Recognition in Videos," Advances in Neural Information Processing Systems, 2014, 9 pages.

Simonyan et al., "Very Deep Convolutional Networks for Large-Scale Image Recognition," https://arxiv.org/abs/1409.1556, last revised Apr. 2015, 14 pages.

Soomro et al., "UCF101: A Dataset of 101 Human Actions Classes From Videos in the Wild," https://arxiv.org/abs/1212.0402, Dec. 2012, 7 pages.

Taylor et al., "Convolutional Learning of Spatio-temporal Features," European Conference on Computer Vision, Sep. 2010, 140-153.

Tran et al., "Learning Spatiotemporal Features with 3D Convolutional Networks," https://arxiv.org/abs/1412.0767v4, last revised Oct. 2015, 16 pages.

Varol et al., "Long-Term Temporal Convolutions for Action Recognition," https://arxiv.org/abs/1604.04494, Jun. 2017, 8 pages.

Wang et al., "Action Recognition with Improved Trajectories," 2013 IEEE International Conference on Computer Vision, Dec. 2013, 3551-3558.

(56) References Cited

OTHER PUBLICATIONS

Wang et al., "Action Recognition with Trajectory-Pooled Deep-Convolutional Descriptors," 2015 IEEE Conference on Computer Vision and Pattern Recognition (CVPR), Jun. 2015, 4305-4314.

Wang et al., "Actions ~ Transformations," https://arxiv.org/abs/1512.00795v1, Dec. 2015, 9 pages.

Wang et al., "Temporal Segment Networks: Towards Good Practices for Deep Action Recognition," https://arxiv.org/abs/1608.00859, Aug. 2016, 16 pages.

Yue-Hei Ng et al., "Beyond Short Snippets: Deep Networks for Video Classification," 2015 IEEE Conference on Computer Vision and Pattern Recognition (CVPR), Jun. 2015, 4694-4702.

Zach et al., "A Duality Based Approach for Realtime TV-L 1 Optical Flow," Pattern Recognition, Sep. 2007, 214-223.

JP Decision to Grant a Patent in Japanese Appln. No. 2019-559346, dated Mar. 15, 2021, 5 pages (with English translation).

JP Office Action in Japanese Appln. No. 2019-559346, dated Dec. 14, 2020, 6 pages.

\* cited by examiner

ACTION RECOGNITION IN VIDEOS USING 3D SPATIO-TEMPORAL CONVOLUTIONAL NEURAL NETWORKS

CROSS REFERENCE TO RELATED APPLICATIONS

This patent application is a continuation (and claims the benefit of priority under 35 USC 120) of U.S. patent application Ser. No. 16/681,671, filed Nov. 12, 2019, which is a continuation of and claims priority to PCT Application No. PCT/EP2018/062486, filed on May 15, 2018, which claims priority to U.S. Provisional Application No. 62/506,507, filed on May 15, 2017. The disclosures of the prior applications are considered part of and are incorporated by reference in the disclosure of this application.

BACKGROUND

This specification relates to neural network systems and to improved methods of training neural network systems. Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as one or more computer programs on one or more computers in one or more locations that processes video data.

As used herein, video data may be any time sequence of 2D or 3D image data frames. In embodiments the image data frames encode spatial position in two or three dimensions; for example the frames may comprise image frames where an image frame may represent an image of a real or virtual scene. More generally an image data frame may define a 2D or 3D map of entity locations; the entities may be real or virtual and at any scale, for example from human scale to atomic scale, the latter comprising for example positions of atoms, regions or secondary structure in a molecule.

Examples of the systems described herein may be used to capture/classify motion of entities or parts of entities represented within the image frames, for example human motion. An output of the system may represent or classify one or more actions identified in a video sequence, and/or may process the video data in other ways, for example for semantic segmentation, video object detection and the like.

Thus output data from the systems described herein may define any kind of score, classification, or regression output based on the input. For example, if the inputs to the neural network are images or features that have been extracted from images, the output generated by the neural network for a given image may be scores for each of a set of action or object motion categories, with each score representing an estimated likelihood that the video contains a sequence of images of an object executing the action category. Systems of this type have applications in robotics, for example to assist in learning to imitate behavior.

Thus broadly speaking in one aspect a neural network system for processing video data may comprise a first data input to receive image data from a first sequence of frames of video data; and a second data input to receive optical flow data from a second sequence of frames of the video data. The system may further comprise a first 3D spatio-temporal convolutional neural network, coupled to the first data input and configured to process the image data in at least three space-time dimensions and to provide a first convolutional neural network output; and a second 3D spatio-temporal convolutional neural network, coupled to the second data input and configured to process the optical flow data in at least three space-time dimensions and to provide a second convolutional neural network output. The system may also comprise a data combiner to combine data from the first and second convolutional neural network outputs to provide a combined processed video data output. The data combiner may average data from the first and second convolutional neural network outputs. The combined processed video data output may comprise a classification data output to provide classification data indicating, for example, a classification of motion within the video data.

Any suitable technique for determining optical flow data may be employed including, for example, a predetermined or learned optical flow computation kernel. The optical flow data may be represented as image data, and may be determined between frames which may, but need not be, neighbouring frames in time. Thus the optical flow data may comprise a sequence of optical flow image frames, or pairs of image frames. The sequence of optical flow image frames processed by the second 3D spatio-temporal convolutional neural network may correspond to a sequence of image frames processed by the first 3D spatio-temporal convolutional neural network.

The neural network system may include pre-processing to generate the optical flow data, and optionally pre-processing to select image frames for processing by the system. Thus the neural network system may include an optical flow determination system coupled between the first data input and the second data input to generate the optical flow data for the second data input from the video data. The optical flow data may comprise two optical flow channels for input to the second 3D spatio-temporal convolutional neural network. Similarly the image data may comprise two or more color image data channels for the first 3D spatio-temporal convolutional neural network. In some implementations the optical flow determination may use the image frames and one additional frame at one or other end of the sequence.

One or both of the first and second 3D spatio-temporal convolutional neural networks may have a modular sub-structure comprising successive sub-modules. Each sub-module may then comprise a set of (one or more) convolutional layers and at least one dimension-reduction layer, such as a 1×1×1 convolution, to reduce a feature map-dimension of convolutional filters in an underlying layer. Each sub-module also comprises and at least one parallel data path circumventing the set of convolutional layers, for example a shortcut connection to a sub-module output or a connection via a pooling layer such as a max- or average-(3D) pooling layer. Such structures facilitate the stacking of multiple sub-modules, helping to improve accuracy and reducing training error and controlling computational complexity.

One or both of the first and second spatio-temporal convolutional neural networks may have 3D convolutional layers and 3D pooling layers with 3D kernels with cubic receptive fields. Nonetheless one or both of the first and second spatio-temporal convolutional neural networks may include 3D pooling layers which pool only space dimensions of the space-time dimensions. This approach can help to align receptive fields of layers within the network in space and time such that a filter or kernel within one of the networks sees an object moving coherently in both space and time.

Where 3D kernels/layers are referred to, this includes 4D kernels/layers since the architectures described herein may be used to process sequences of voxels as well as pixels, for example to process medical image data such as 4D ultrasound or magnetic resonance imaging data, for example to classify motion such as cardiac motion.

In some embodiments one or both of the first and second 3D spatio-temporal convolutional neural networks may comprise a succession of two, three or more sub-modules. Each sub-module may have at least two series-connected 3D convolutional layers, these series-connected layers being connected in parallel with one another; a 3D pooling layer before the sub-module output, and at least one dimension-reducing layer between the sub-module input and the sub-module output. Such arrangements have been found to be particularly accurate when classifying input data.

One or both of the 3D spatio-temporal convolutional neural networks may have an inflated 2D architecture.

Thus in another aspect a method of providing neural network system comprises identifying a 2D neural network architecture for 2D image processing, the 2D neural network architecture comprising a succession of convolutional layers and pooling layers each defined by a respective 2D kernel. The method then inflates the 2D neural network architecture by adding a temporal dimension to the 2D kernels to convert the kernels to 3D kernels operating over space and time dimensions to provide an inflated neural network architecture. This inflated neural network architecture is then trained on video data to produce a trained 3D neural network.

In some embodiments weight parameters from a trained version of the 2D neural network architecture are used to initialize or pre-train the inflated neural network architecture prior to the training proper, for example by repeating a scaled version of the weight parameters in a time dimension in the inflated architecture. Somewhat counter-intuitively, given the final, trained weight parameters, this has been found to provide a substantial benefit in trained network accuracy. Additionally or alternatively, for additional benefit, the training may comprise two stages, a first training stage using a first data set and a second training stage using a second, different data set. Generally, the first data set and the second data set represent examples which may be classified into some or all of the same categories and, in some cases, are substantially disjoint.

In another aspect a method of providing trained neural network system comprises providing at least one spatio-temporal convolutional neural network coupled to a data input and configured to process input data in at least three space-time dimensions using a succession of convolutional layers and pooling layers each defined by a respective kernel to provide a convolutional neural network output. The spatio-temporal convolutional neural network may comprise an inflated 2D neural network architecture in which a temporal dimension has been added to 2D kernels of a 2D neural network architecture to convert the kernels to 3D kernels operating over space and time dimensions. The weights of the spatio-temporal convolutional neural network may be initialised using weights of a trained version of the 2D neural network architecture to provide an initialised spatio-temporal convolutional neural network. Additionally or alternatively, weights of the spatio-temporal convolutional neural network may be initialised by training on a pre-training data set different to that used for the subsequent training. The initialised spatio-temporal convolutional neural network may then be trained to provide trained neural network system.

The subject matter described in this specification can be implemented in particular embodiments so as to realize one or more of the following advantages.

In some implementations the described neural network systems can achieve substantially improved classification accuracy on video data sets such as those including examples of human motion. Because of the architecture of the described first and second 3D spatio-temporal convolutional neural networks, embodiments of the systems may also have fewer parameters for the same depth of network, and can therefore more easily operate on higher spatial resolution video and/or employ a longer temporal receptive field, thus extracting features representing motion characterized over longer periods of time. Put differently, the systems described herein may have reduced processing and memory requirements compared with other systems because fewer parameters may be required for a given classification accuracy.

Examples of the systems are also able to take advantage of previously successful still image characterization architectures, extending these in a principled manner to provide improved accuracy and faster training. Learned parameters of these architectures can be used to initialize the networks described herein, for faster, more accurate training. In some implementations pre-training on a different data set to that used for the training procedure can produce further action classification accuracy improvements.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes neural network systems for processing video data. The video data comprises a time sequence of images, typically 2D images but potentially 3D images. The images may comprise images captured by an image sensor such as a camera and/or they may comprise radar, for example LIDAR images. The images may be captured in the visual and/or other regions of the electromagnetic spectrum. Alternatively the video data may be derived from a simulation or game and may depict objects and/or actors in the simulation or game. The video data may be pre-processed before being provided to the neural network system, for example to extract features from the images.

In some implementations the video data is processed to recognize, more particularly classify, one or more actions represented by the video data. More generally however the described neural network systems have an architecture which may be used to process video data for any purpose, by training a neural network system with the described architecture to perform the task. For example a neural network system as described herein may be trained to recognize or classify object motion, for example for medical or engineering diagnostic purposes or for use by the control system of an autonomous or semi-autonomous vehicle or robot. For example a vehicle or robot may be controlled to respond to recognized object motion, for example to take precautionary or evasive action, or to initiate grasping an object. In some other applications an action or behavior may be recognized in order to facilitate a robot or vehicle learning to imitate the action or behavior.

Thus an output from a neural network system as described herein may comprise a set of scores, which may be probabilities in the range [0,1]. Each score may represent an estimated likelihood that the video data comprises a sequence of images representing a corresponding classification category, for example a recognized action, object behavior or object motion.

In still other applications a neural network system as described herein may be used for classifying video data, for example according to action category, for example to facilitate video search. For example the output generated by the neural network system for a given image may be scores for each of a set of action (object motion) categories, with each score representing an estimated likelihood that the video data contains a sequence of images of an object executing the action category. As another example, each score may represent an estimated likelihood that the video is about a topic. As another example the output generated by the neural network system may be a score that represents an estimated likelihood that a particular video advertisement will be clicked on. Here the data input to the system may include or one or more features of an impression context for the advertisement. As another example the output generated by the neural network system may be a score for each of a set of content items, with each score representing an estimated likelihood that the user will respond favorably to being recommended the content item. Here the video data input to the system may include one or more features of a personalized recommendation for a user, for example features characterizing a context for the recommendation, such as features characterizing previous actions taken by the user.

Figure 1:
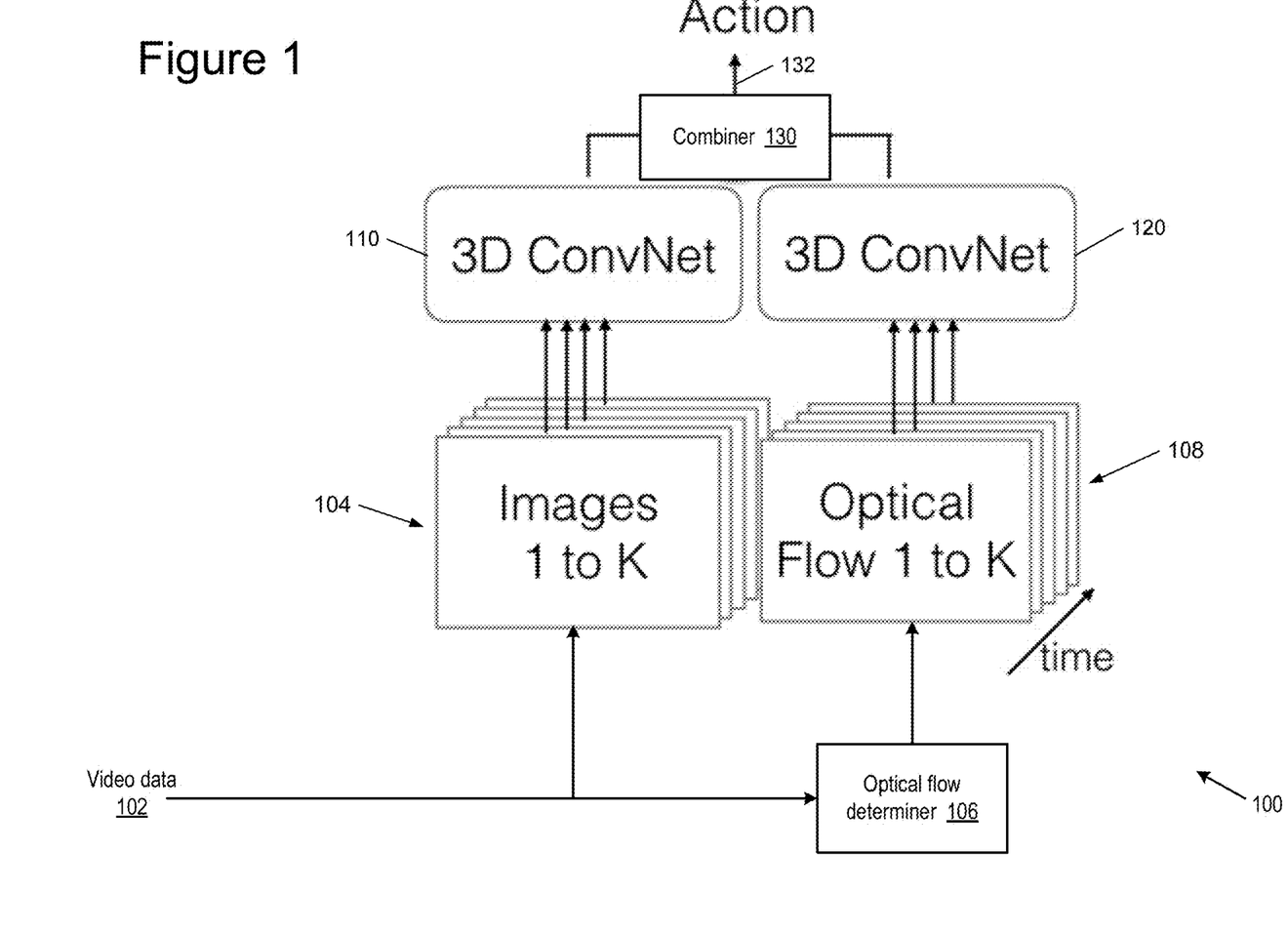
FIG. 1 shows an example neural network system for processing video data.

FIG. 1 shows an example neural network system 100 for performing a task as described above. The system comprises a video data input 102 to receive video data comprising a sequence of image frames, which are processed a set of K image frames 104 at a time. The sets of K image frames may overlap. The video data may be provided in compressed form, in which case image frames may be extracted from the video data prior to processing by the neural network system 100. An image frame may be a color image frame, in which case the frame may comprise multiple color channels, for example RGB or YUV color channels.

The video data 102 is also provided to an optical flow determiner 106. This is typically implemented in software and is configured to determine optical flow data, for example a set of optical flow frames 108, for example optical flow frames corresponding to the K image frames. An optical flow frame may comprise data for a pair of optical flow channels representing horizontal (x) and vertical (y) components of optical flow. The pair of optical flow channels may be considered as image channels imaging the optical flow; they may have the same resolution as the image frames. There may be an optical flow frame, for example a pair of optical flow images, for each image frame of the video. Thus the optical flow determiner 106 may determine K optical flow frames for the K image frames. However because an optical flow frame is generally constructed from data from two (or more) images the first optical flow frame may be derived from the first and second image frames and so forth, so that the final optical flow frame may use data from the K+1$^{th}$ image frame.

There are many techniques for determining optical flow. In one implementation the optical flow determiner uses a TV-L1 algorithm (total variation flow field regularization, $L^1$ norm for data fidelity). A set of optical flow frames may comprise a set of x-displacement values for each pixel location and a set of y-displacement values for each pixel location for each of the optical flow frames. Alternatively the optical flow may comprise samples along motion trajectories from one frame to another. In this case the set of optical flow frames may comprise, at each pixel location, x- and y-components of a vector mapping the motion of a pixel through successive image frames from the first frame. For example the first optical flow frame vector for the pixel is from the first to the second image frame, the next is from where the pixel is in the second frame to the third frame, and so forth; each successive vector being stored in the successive optical flow frames at the starting location of the pixel in the first frame of the set of frames. In some implementations a bi-directional optical flow may be employed, for example with some optical flow frames encoding forward flow and other, for example interleaved frames encoding backward flow to a previous frame. In some implementations the optical flow frames may compensate for camera or other sensor movement, for example by subtracting an estimated global motion component, for example derived from a mean of the displacement values.

The set of image frames 104 provides an input to a first 3D convolutional neural network 110. In broad terms the 3D convolutional neural network 110 comprises 3D kernels, where a kernel may comprise a filter or pooling operation. The 3D kernels receive spatio-temporal data as input—that is they receive data from a time sequence of input frames.

In some implementations the architecture of the 3D convolutional neural network 110 may be based on an inflated 2D convolutional neural network architecture. For example the filter and pooling kernels of a 2D convolutional neural network may be inflated by endowing them with an additional time dimension. For example where a filter or pooling kernel is square it may be made cubic, that is an N×N filter may become an N×N×N filter. The 3D convolutional neural network 110 may have multiple input channels, for example one per image color channel, treated like feature maps. The filters have learnable parameters which are adjusted during training, as described later.

The set of optical flow frames 108 provides an input to a second 3D convolutional neural network 120. This may have a generally similar architecture to the first 3D convolutional neural network 110, and similarly receives spatio-temporal data as input, that is they receive data from a time sequence of optical flow frames. An example architecture for the 3D convolutional neural networks is described later. The second 3D convolutional neural network 120 may have a two-channel input to receive a pair of optical flow images.

The first and second 3D convolutional neural networks each provide a hierarchical spatio-temporal representation of the input video data. Outputs from the first and second 3D convolutional neural networks are combined by combiner 130 to provide a neural network system output 132. In some implementations the output from each 3D convolutional neural network comprises a set of scores, one for each of a corresponding set of classification categories classifying semantic content of the video data. An output layer of these neural networks may implement a softmax function and the scores may represent respective probabilities of the categories. In some implementations the categories may represent categories of actions or object motions represented by the video data. The output from combiner 130 may similarly comprise classification data such as a set of scores representing respective probabilities of each of a set of classification categories which the neural network system has been trained to distinguish.

In some implementations the combiner 130 may average the scores from each 3D convolutional neural network. In some other implementations the combiner 130 may linearly combine the scores in some other manner. For example the combiner 130 may comprise a learned linear classifier such as a multi-class support vector machine. In still other implementations combiner 130 may implement one or more 3D convolutional neural network layers to provide the classifier score output. For example feature maps from the upper layers of the 3D convolutional neural networks 110, 120 may be combined and provided to one or more further convolutional neural network layers implemented by combiner 130.

The predictions (scores) from combiner 130 may be provided at every time step/frame or for every K time steps/frames. The predictions (scores) may be averaged over time.

The neural network system 100 of FIG. 1 may be trained end-to-end. For example the system may be provided with labelled examples of video data representing examples of classes for the system to learn to distinguish. Additional examples for training may be generated by random cropping, resizing, and flipping the video, and the examples may be temporally randomized by randomly picking the starting frame. Learnable parameters of the system, in particular weights of the filters of the 3D convolutional neural networks, may then be adjusted by backpropagating gradients derived from a cost function representing the classification errors in the category scores. In some implementations each 3D convolutional neural network 110, 120 is trained separately and the scores from these networks are averaged by combiner 130. In some other implementations the system may be trained as a whole, based on the output of combiner 130.

An example implementation will now be described in more detail.

Figure 2A:
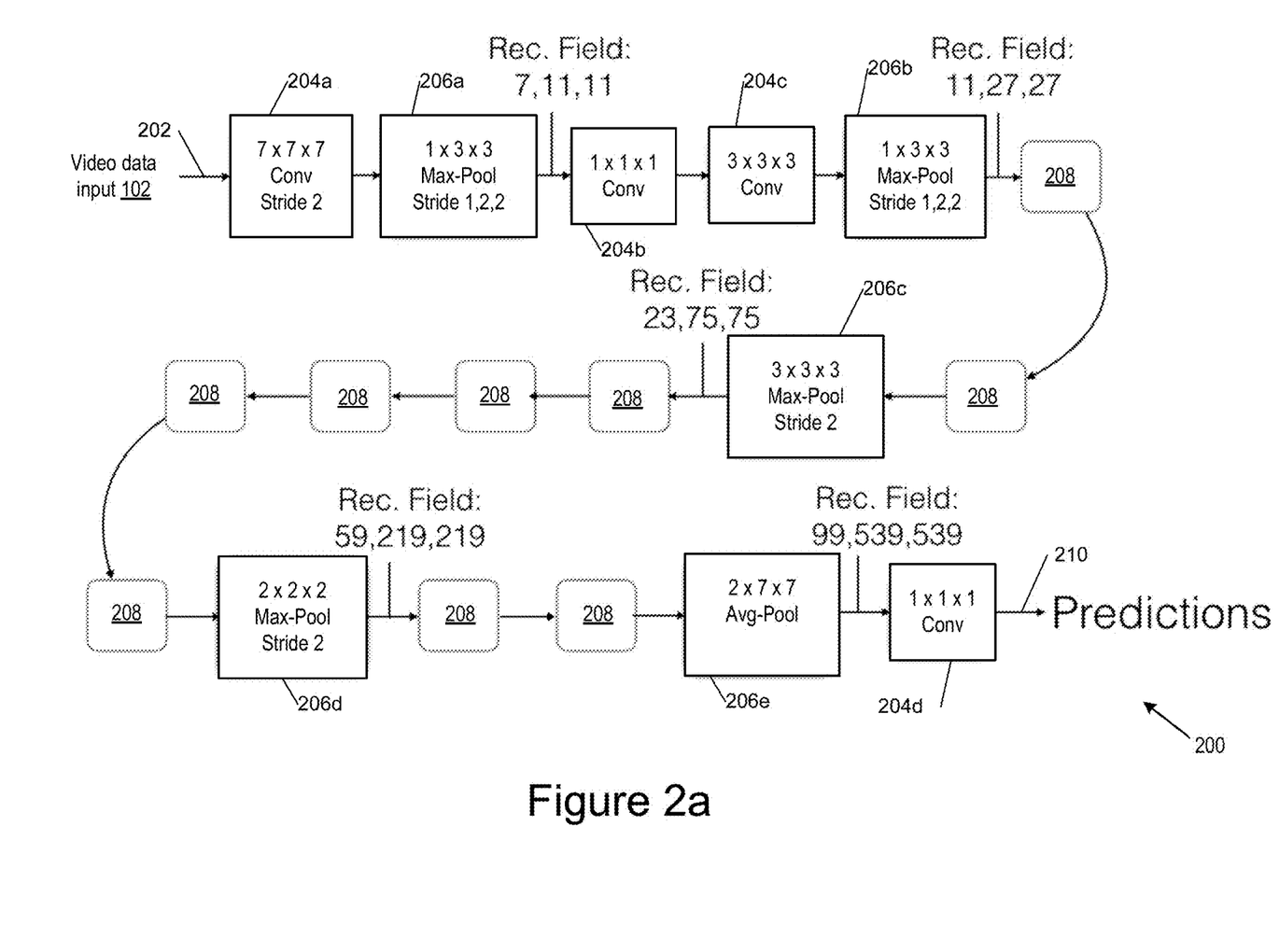
FIGS. 2a and 2b show details of an example neural network for the system of FIG. 1.

Thus referring to FIG. 2a, this shows an example of a 3D convolutional neural network 200, which may be employed for either of both of 3D convolutional neural networks 110, 120. The neural network 200 has a video input 202 to receive the image frames or optical flow frames. As illustrated this is a single channel input but may in practice have multiple channels, in which case the kernels may have the number of channels as an additional dimension.

Figure 2B:
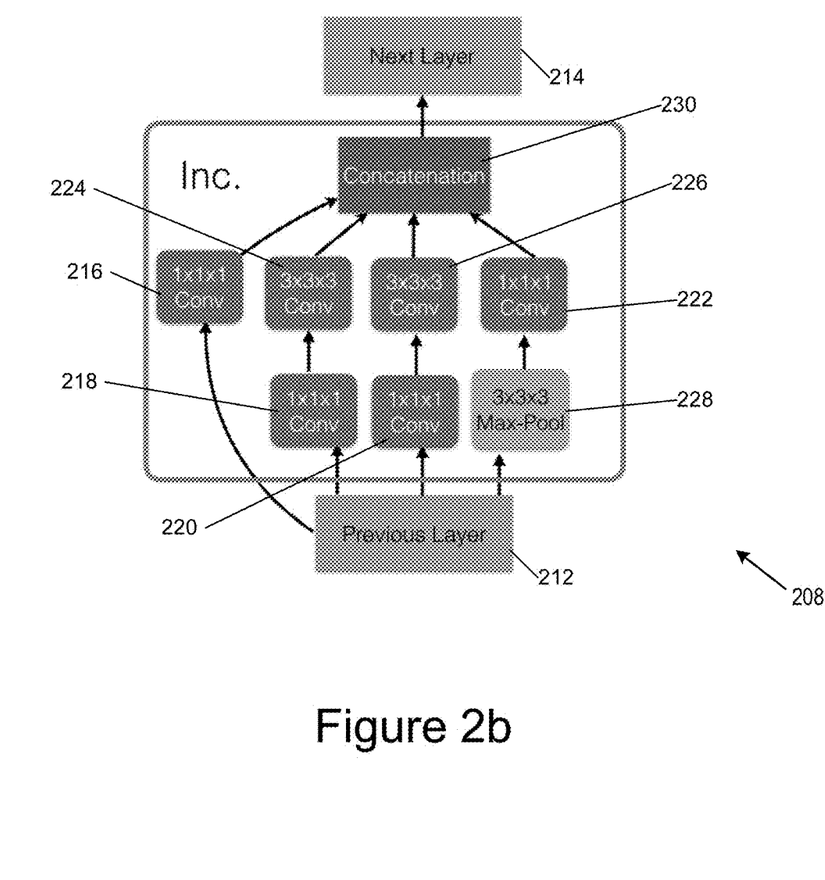

The video provides an input to a succession of convolution layers 204a-d, max- or average-pooling layers 206a-e and sub-modules 208. The neural network 200 has a prediction output 210 which provides predictions, for example scores, as previously described. An example sub-module is shown in FIG. 2b. In FIG. 2a the (single channel) kernel receptive field sizes are denoted by labels k×i×j where i and j denote spatial dimensions in units of pixels and k denotes the temporal dimension in units of frames. The kernel strides are similarly labelled, and where not given are 1. In some implementations each convolution layer may be followed by a batch normalization layer and an activation function such as a ReLU (rectified linear) activation function (not shown). One or more 1×1×1 convolutions 204b,d may be employed to perform dimension reduction by pooling across multiple feature maps. A softmax layer and optionally one or more fully connected layers (not shown) may be provided immediately before the prediction output 210.

Whilst a convolutional neural network has feature receptive fields which are symmetrical with regard to the horizontal and vertical directions, when considering time the receptive field should depend on frame rate and image dimensions. If the receptive field grows too quickly it may conflate edges from different objects whilst if it grows too slowly it may not capture some of the scene dynamics well. In general the neural network 200 may be configured so that the receptive fields of at least some of the kernels are different in the spaces dimensions and time dimension, in units of pixels and frames. For example there may be spatial pooling but no temporal pooling in one or more lower (closer to the input) layers of the neural network 206a,b.

Referring to FIG. 2b, an example sub-module 208 has an input from a previous layer 212 and provides an output to a next layer 214. The sub-module may comprise a plurality of parallel paths between the input and output. These may include one or more dimension reduction 1×1×1 convolutions 216, 218, 220, 222, one or more of which may also implement a non-linear activation such as a rectified linear activation. One or more parallel paths may include convolutions 224, 226 of different sizes; these may be factorized into chains of smaller convolutions. One of the parallel paths may include a pooling operation 228. The outputs from the parallel paths may be combined by a concatenation operation 230. The operations implemented by the neural network 200 and by the sub-modules 208 include parameters which are learned by supervised training.

Whilst the system of FIGS. 1 and 2 can be trained from scratch, some implementations of the system bootstrap the training when using an inflated 2D network of the type previously described. When a 2D network architecture is inflated by, say, expanding 2D N×N filters to N×N×N filters the system may be constrained so that a "boring" video consisting of a repeated image frame should result in the same pooled activations as those in the trained 2D network when presented with the same image as a single-image input. This can be achieved by repeating the weights of the trained 2D network N times along the time dimension and then rescaling them by dividing by N. The same principle may be employed if expanding an N×N filter to an N×N×M filter. In this way the convolutional filter response may be the same for the 3D network presented with the "boring" video as for the original 2D network from which the 3D network architecture was derived by "inflation". Since the outputs of the convolutional filters are constant in time for the "boring" video the outputs of pointwise non-linearity layers and average- and max-pooling layers are also the same as for the 2D architecture, and hence the overall network respects the "boring" video constraint.

Figure 3:
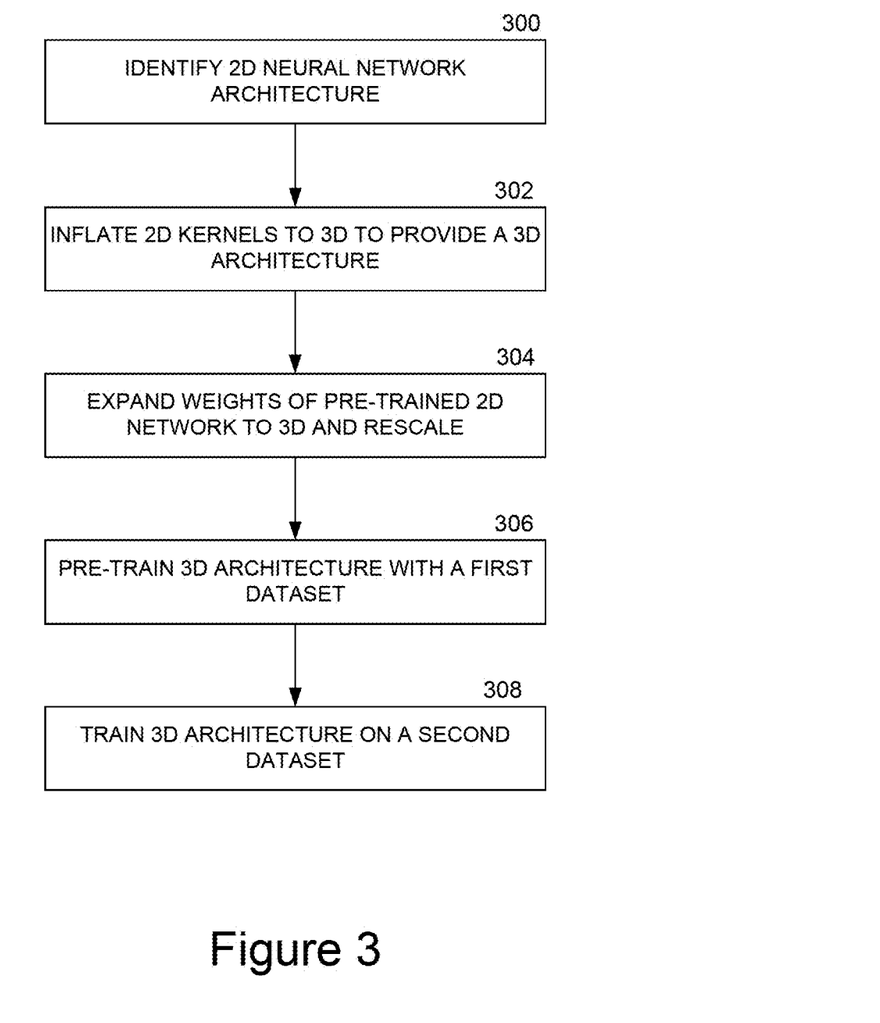
FIG. 3 shows a flow diagram of an example process for providing a trained neural network system for processing video data.

FIG. 3 shows an example procedure for instantiating and training a neural network as described above, for example to classify motion in video data.

Thus at step 300 the system identifies a 2D neural network architecture which has previously been found to be useful for image classification. The system then inflates the filter and pooling kernels to 3D as previously described (step 302). This provides a 3D neural network architecture for the system. The system initializes the weights of the trained 2D neural network architecture are of one or both of the 3D convolutional neural networks 110, 120, again as previously described (step 304). The system then trains the neural networks of FIG. 1 by supervised learning and backpropagation, either training each 3D neural network separately or in tandem, or training the neural networks end-to-end. In some implementations to improve performance the system 100 may be pre-trained on a large video dataset (step 306) in order to learn relevant features and the system 100 may then be trained on a second, potentially smaller target dataset (step 308). This may involve training just the last layers (nearest the output) of the system whilst freezing the other network weights.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural network system for processing video data, the neural network system comprising:
   a first data input to receive image data from a first sequence of frames of video data;
   a second data input to receive optical flow data from a second sequence of frames of the video data;
   a first 3D spatio-temporal convolutional neural network, coupled to the first data input and configured to process the image data in at least three space-time dimensions and to provide a first convolutional neural network output;
   a second 3D spatio-temporal convolutional neural network, coupled to the second data input and configured to process the optical flow data in at least three space-time dimensions and to provide a second convolutional neural network output; and
   a data combiner to combine data from the first and second convolutional neural network outputs to provide a combined processed video data output,
   wherein at least one of the first 3D spatio-temporal convolutional neural network or the second 3D spatio-temporal convolutional neural network has an inflated 2D neural network architecture generated by adding a temporal dimension to 2D kernels of a 2D neural network architecture to convert the 2D kernels to 3D kernels.

2. The neural network system of claim 1, wherein at least one of the first 3D spatio-temporal convolutional neural network or the second 3D spatio-temporal convolutional neural network has a modular sub-structure comprising successive sub-modules, wherein each said sub-module comprises a set of convolutional layers and at least one dimension-reduction layer to reduce a feature map-dimension of convolutional filters in an underlying layer.

3. The neural network system of claim 1, wherein at least one of the first 3D spatio-temporal convolutional neural network or the second 3D spatio-temporal convolutional neural network has a modular sub-structure comprising successive sub-modules, wherein each said sub-module comprises a set of convolutional layers and at least one parallel data path circumventing the set of convolutional layers.

4. The neural network system of claim 1, wherein at least one of the first 3D spatio-temporal convolutional neural network or the second 3D spatio-temporal convolutional neural network includes 3D convolutional layers and 3D pooling layers each having kernels with at least 3D k×i×j receptive fields in which i and j label spatial dimensions and k labels a temporal dimension and in which i=j=k.

5. The neural network system of claim 1, wherein at least one of the first 3D spatio-temporal convolutional neural network or the second 3D spatio-temporal convolutional neural network includes 3D pooling layers which pool only space dimensions of the space-time dimensions.

6. The neural network system of claim 1, wherein at least one of the first 3D spatio-temporal convolutional neural network or the second 3D spatio-temporal convolutional neural network comprises: at least two sub-modules each having at least two series-connected 3D convolutional layers, wherein the at least two series-connected 3D convolutional layers are connected in parallel with one another, a 3D pooling layer before a sub-module output, and at least one dimension-reducing layer between a sub-module input and the sub-module output.

7. The neural network system of claim 1, further comprising an optical flow determination system coupled between the first data input and the second data input to generate the optical flow data for the second data input from the video data.

8. The neural network system of claim 1, wherein the optical flow data comprises at least two optical flow channels and wherein the second 3D spatio-temporal convolutional neural network has at least two corresponding input channels.

9. The neural network system of claim 1, wherein the image data comprises color image data represented by at least two image data channels and wherein the first 3D spatio-temporal convolutional neural network has at least two corresponding input channels.

10. The neural network system of claim 1, wherein the data combiner is configured to average data from the first and second convolutional neural network outputs.

11. The neural network system of claim 1, wherein the combined processed video data output comprises a classification data output to provide classification data indicating a classification of motion within the video data.

12. A method of processing video data, the method comprising:
  receiving image data from a first sequence of frames of video data;
  receiving optical flow data from a second sequence of frames of the video data;
  processing the image data using a first 3D spatio-temporal convolutional neural network configured to process the image data in at least three space-time dimensions and to provide a first convolutional neural network output;
  processing the optical flow data using a second 3D spatio-temporal convolutional neural network configured to process the optical flow data in at least three space-time dimensions and to provide a second convolutional neural network output; and
  combining data from the first and second convolutional neural network outputs to provide a combined processed video data output,
  wherein at least one of the first 3D spatio-temporal convolutional neural network or the second 3D spatio-temporal convolutional neural network has an inflated 2D neural network architecture generated by adding a temporal dimension to 2D kernels of a 2D neural network architecture to convert the 2D kernels to 3D kernels.

13. The method of claim 12, wherein at least one of the first 3D spatio-temporal convolutional neural network or the second 3D spatio-temporal convolutional neural network has a modular sub-structure comprising successive sub-modules, wherein each said sub-module comprises a set of convolutional layers and at least one dimension-reduction layer to reduce a feature map-dimension of convolutional filters in an underlying layer.

14. The method of claim 12, wherein at least one of the first 3D spatio-temporal convolutional neural network or the second 3D spatio-temporal convolutional neural network has a modular sub-structure comprising successive sub-modules, wherein each said sub-module comprises a set of convolutional layers and at least one parallel data path circumventing the set of convolutional layers.

15. The method of claim 12, wherein at least one of the first 3D spatio-temporal convolutional neural network or the second 3D spatio-temporal convolutional neural network includes 3D convolutional layers and 3D pooling layers each having kernels with at least 3D k×i×j receptive fields in which i and j label spatial dimensions and k labels a temporal dimension and in which i=j=k.

16. The method of claim 12, further comprising: averaging data from the first and second convolutional neural network outputs using a data combiner.

17. One or more non-transitory computer storage media storing instructions that, when executed by one or more computers, cause the one or more computers to perform operations for processing video data, the operations comprising:
  receiving image data from a first sequence of frames of video data;
  receiving optical flow data from a second sequence of frames of the video data;
  processing the image data using a first 3D spatio-temporal convolutional neural network configured to process the image data in at least three space-time dimensions and to provide a first convolutional neural network output;
  processing the optical flow data using a second 3D spatio-temporal convolutional neural network configured to process the optical flow data in at least three space-time dimensions and to provide a second convolutional neural network output; and
  combining data from the first and second convolutional neural network outputs to provide a combined processed video data output,
  wherein at least one of the first 3D spatio-temporal convolutional neural network or the second 3D spatio-temporal convolutional neural network has an inflated 2D neural network architecture generated by adding a temporal dimension to 2D kernels of a 2D neural network architecture to convert the 2D kernels to 3D kernels.

18. The non-transitory computer storage media of claim 17, wherein the image data comprises color image data represented by at least two image data channels and wherein the first 3D spatio-temporal convolutional neural network has at least two corresponding input channels.

19. The non-transitory computer storage media of claim 17, wherein the operations further comprise: averaging data from the first and second convolutional neural network outputs using a data combiner.

20. The non-transitory computer storage media of claim 17, wherein the combined processed video data output comprises a classification data output to provide classification data indicating a classification of motion within the video data.

* * * * *